April 13, 1926.
J. B. DUBY
1,580,470
GASOLINE FILTER AND SEPARATOR
Filed Nov. 11, 1922
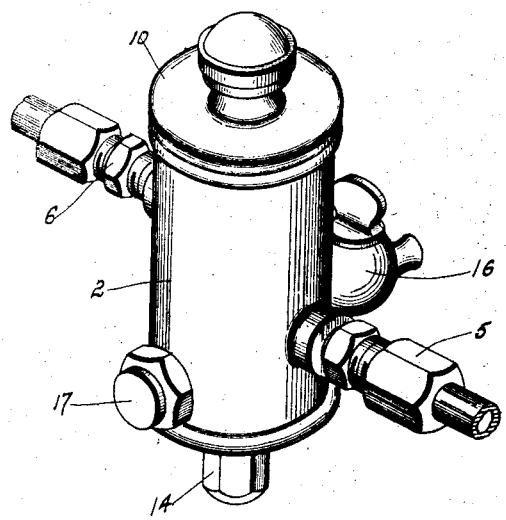
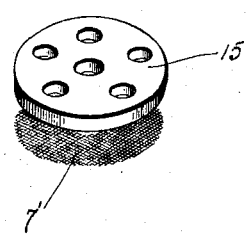
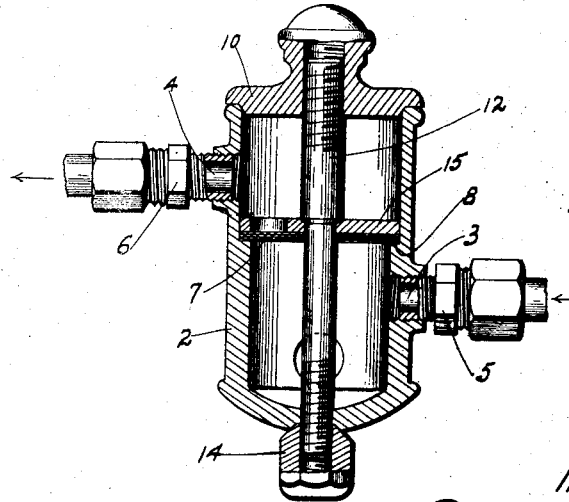
INVENTOR
John B. Duby,
By his attorney,
J. H. McCurdy.

Patented Apr. 13, 1926.

1,580,470

UNITED STATES PATENT OFFICE.

JOHN B. DUBY, OF CANTON, MASSACHUSETTS.

GASOLINE FILTER AND SEPARATOR.

Application filed November 11, 1922. Serial No. 600,293.

*To all whom it may concern:*

Be it known that I, JOHN BATES DUBY, a citizen of the United States, residing at Canton, in the county of Norfolk and State of Massachusetts, have invented certain new and useful Improvements in Gasoline Filters and Separators, of which the following is a specification.

This invention relates to filtering devices for liquids, and is especially concerned with devices of this character designed to be used in the gasoline line of a motor vehicle.

It is customary at the present time to use one or more screens in the gasoline line that leads from the supply tank to the carburetor of an automobile. These screens are intended to strain out dirt and prevent its reaching the carburetor where it would be very likely to lodge in the needle valve and thus interfere seriously with the proper flow of fuel mixture to the cylinders of the engine. The screens with which automobiles usually are equipped, however, perform this function only very imperfectly, as automobile owners have abundant reason to know. While these screens usually do catch the larger particles of dirt and foreign materials that are carried along in the stream of gasoline, they fail to strain out the fine sediment which often causes even more trouble than the relatively large particles of solid matter. Furthermore, such screens are so located that it is usually difficult to clean them, and they are totally ineffective in separating water from the gasoline.

The present invention has for its chief object to devise a filtering device which can be conveniently connected into the gasoline line immediately behind the carburetor, and which will not only effectually filter out any particles of solid material that might cause trouble in the carburetor, but will also separate from the gasoline any water entrained therein. It is also an object of the invention to devise an article of this character which will eliminate much of the tendency for the particles of dirt to mat on to the filter, and which can easily be kept clean.

The nature of the invention will be readily understood from the following description when read in connection with the accompanying drawings, and the novel features will be particularly pointed out in the appended claims.

Referring now to the drawings,

Figure 1 is a perspective view of a filtering device embodying the invention in the form at present preferred;

Fig. 2 is a vertical cross sectional view of the device shown in Fig. 1; and

Fig. 3 is a perspective view of a portion of the filter and the perforated ring that holds the filter in its seat.

The construction shown comprises a hollow body or casing 2 having an inlet opening 3 near the lower end thereof and an outlet opening 4 near its upper end. Suitable connectors or fittings 5 and 6 are threaded into the body to permit the connection of the filter in the gasoline line. Positioned between the inlet and outlet is a filter 7 which is supported on a circumferential shoulder or seat 8 formed in the body 2. This body preferably is of circular cross section, and the filter consists of several superposed sheets of wire fabric or gauze, one such sheet of gauze being designated at 7', Fig. 3. The upper open end of the body 2 is closed by an imperforate cover 10 having a tapered portion to fit in a correspondingly tapered seat in the body, this cover being held in place by a rod 12 which extends through the body from end to end. The upper end of this rod is threaded into the cover 10, and a nut 14 threaded on the lower end of the rod has a tapered or conical end which fits in a tapered seat formed in the bottom of the body 2, this nut acting through the rod 12 to draw the cover firmly into its seat. At an intermediate point in its length, the rod 12 is provided with a shoulder which bears on a perforated disk 15 that rests on the filter 7 and holds the filter firmly in its seat 8.

This filtering device is connected in the gasoline line in substantially the position shown, the inlet being lower than the outlet. Gasoline flows into the chamber below the filter 7 and then flows upwardly through the filter and out through the outlet 4. Due to this arrangement any water or heavy particles of dirt carried along with the gasoline will settle in the lower part of the chamber below the filter. Any particles of dirt which are so small as to be carried along by the current of gasoline will, however, be caught by the filter 7 and strained out. Preferably the filtering material used is of such a nature that when once wet with gasoline, it will not permit the passage of water through it. A very fine wire gauze answers this purpose, but chamois and other materials may be used in its place. The delivery of clean gasoline only to the carburetor thus is ensured.

For the purpose of enabling the driver to drain off the water or sediment trapped in the lower chamber of the device, a drain cock 16 is threaded into the body near the bottom of this chamber. A plug 17 is threaded into the body at a diametrically opposite point so that the petcock and plug can be interchanged when it is desired to have the drain cock on the opposite side of the body.

Usually it is necessary to clean the filter 7 at only relatively infrequent intervals, but it is desirable to open the cock 16 occasionally and drain off the water and sediment that have collected in the lower chamber. Should the filter become plugged with sediment, however, it is simply necessary to unscrew the nut 14 and remove the cover 10, disk 15, and filter 7. The filter may then be cleaned and replaced, or a new one may be substituted.

The invention therefore provides a device which not only effectively removes dirt from the gasoline stream, but also removes water which often is entrained with the gasoline. The device is sturdy and substantial in construction and all the parts preferably are made of brass, bronze or other metal which will not be corroded by the liquid that comes in contact with it, so that it will last practically as long as the vehicle on which it is installed.

While I have herein shown and described the best embodiment of my invention which I have so far devised, it will be appreciated that the invention may be embodied in other forms without departing from the spirit or scope thereof.

Having thus described my invention, what I desire to claim as new is:

1. A device of the character described comprising a hollow body, an inlet opening into the lower part of said body, an outlet leading from the upper part of said body, a filter positioned between said inlet and outlet, said body having an open top with a tapered seat therein, an imperforate cover having a tapered portion to fit in said seat, a rod having its upper end secured in said cover and extending longitudinally through said body, and a nut having a tapered end to engage a correspondingly shaped seat in the lower side of said body and having a threaded engagement with said rod, whereby it is operative to draw said cover snugly into its seat.

2. A device of the character described comprising a hollow body, an inlet opening into the lower part of said body, an outlet leading from the upper part of said body, a filter positioned between said inlet and outlet, said body having a seat therein supporting said filter and having an open top provided with a tapered seat, a cover having a tapered portion to fit in said tapered seat, a rod fastened at its upper end to said cover and projecting through said body, said body having a hole in the bottom thereof through which said rod projects, said hole being outwardly tapered, and a nut having a tapered end to fit said hole and threaded on the lower end of said rod.

JOHN B. DUBY.